United States Patent Office 3,446,133
Patented May 27, 1969

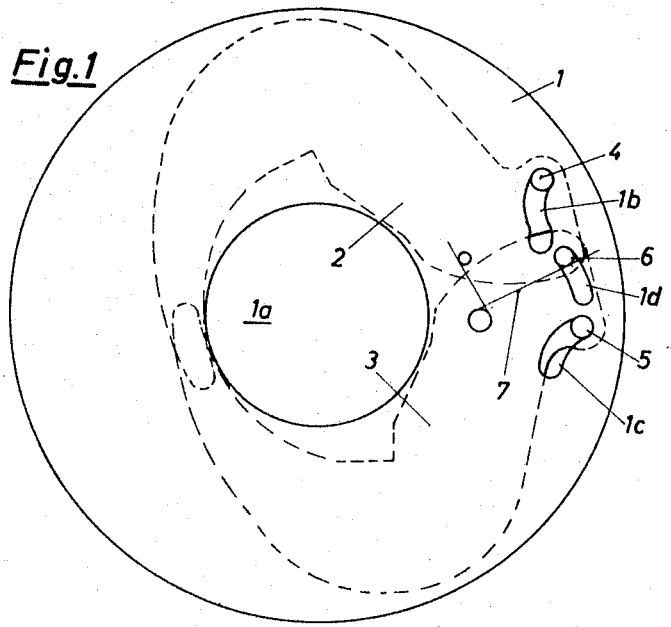
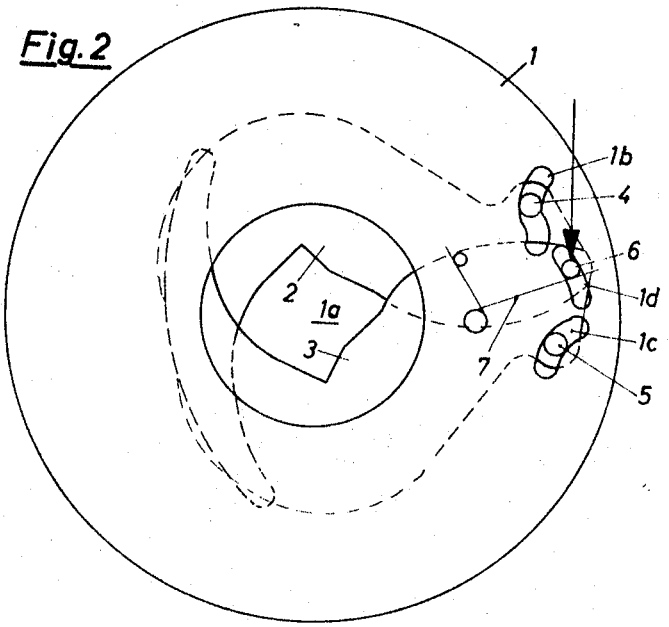

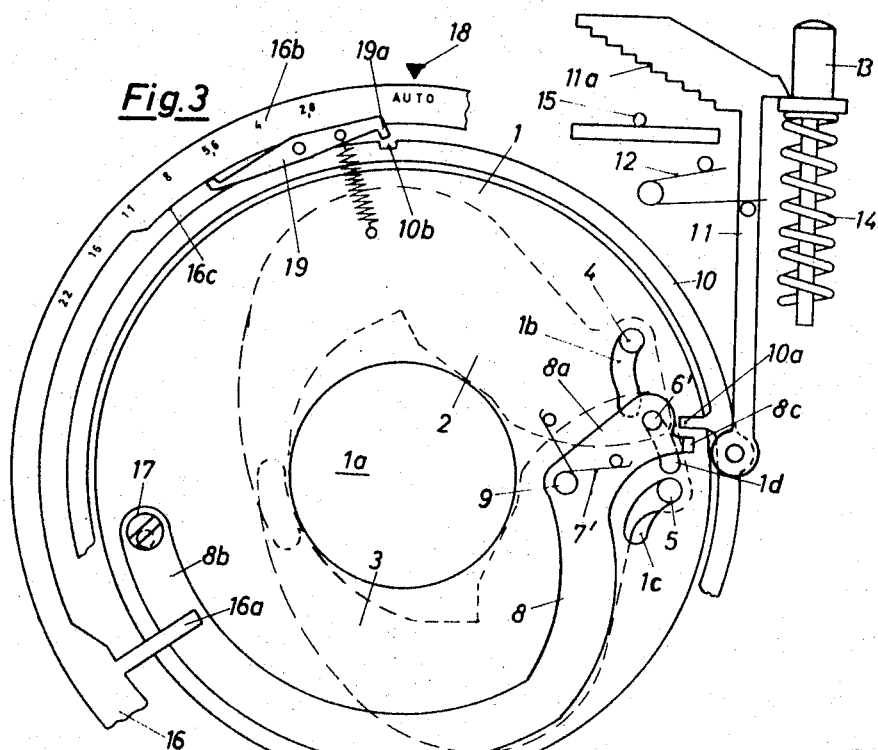
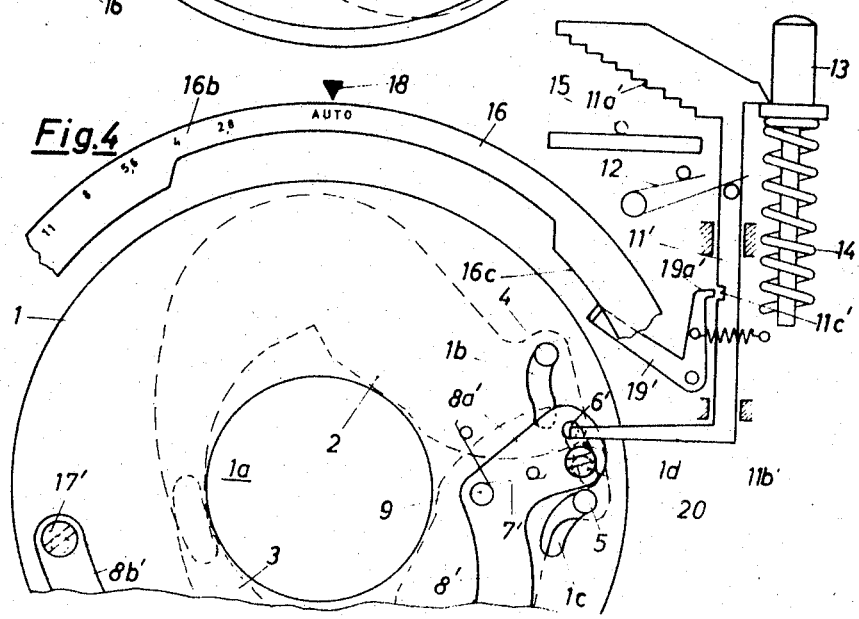

3,446,133
VARIABLE-APERTURE DIAPHRAGM HAVING TWO DIAPHRAGM BLADES
Franz W. R. Starp, Calmbach, Black Forest, Germany, assignor to Prontor-Werk Alfred Gauthier, G.m.b.H., Calmbach, Black Forest, Germany, a corporation of Germany
Filed July 25, 1966, Ser. No. 567,738
Claims priority, application Germany, July 26, 1965, P 37,318
Int. Cl. G03b 9/06
U.S. Cl. 95—64                                                  7 Claims

ABSTRACT OF THE DISCLOSURE

A lens diaphragm arrangement having two diaphragm discs and a first pin linking the discs together. A diaphragm housing is provided having a guide slot with the first pin engaging the slot. A second pin is provided on one of the discs and a third pin is provided on the other of the discs. In addition, a first control slot is provided on the housing engaging the second pin and a second control slot is provided in the housing engaging the third pin. The guide slots and the first and second control slots extend approximately in the same direction. First means are provided to apply pressure to the first pin to move this pin along the guide slot in one direction to cause the discs to move apart.

---

The invention relates to a lens diaphragm for photographic cameras, consisting of two diaphragm disks which pivot in opposite directions to determine the lens aperture.

In diaphragms of the aforementioned type, the two diaphragm disks are usually mounted on a fixed shaft so they can turn. Shifting of the diaphragm disks is accomplished by means of a pin, engaging a slot in each of the diaphragm disks and moving approximately radially with respect to the optical axis. This diaphragm mounting has the disadvantage of requiring relatively great forces to shift the diaphragm disks, especially in the range of large diaphragm apertures, because in this range the steering slots have a relatively steep incline, bordering almost on the limit of self-locking. Beyond this, special components are often required to reorient the movements of the diaphragm setting control into the radial direction of travel of the pin in engagement with the diaphragm disks.

A principal object of the present invention is to eliminate the aforementioned disadvantages inherent in a diaphragm of the above type, i.e. to provide, at the least possible structural expense, a diaphragm with two diaphragm disks moving in opposing directions, in which relatively small shifting forces suffice to set the diaphragm.

To solve the problem posed, the invention proposes in essence to link the two diaphragm disks to each other by means of a pin guided in a fixed slot and to have each disk carry a separate guide pin, each of the latter guide pins engaging a separate, fixed steering slot, whereby the shape and the relative position of the slots, extending in approximately the same direction, are such that the disk system opens continually when the jointed pin is shifted in one direction and closes when the pin is shifted in the opposing direction. This way it was possible to create the conditions enabling the diaphragm to be set with the least possible power requirements, without special reorientation or reduction components between the setting control and the jointed pin that receives the shifting forces. Another advantage can be obtained by shaping all of the slots to achieve a more linear relation between the motion of the jointed pin and the motions of the diaphragm disks. This is especially advantageous when the diaphragm is to be set in various ways, such as manually and automatically, since special linearization means are not needed. As to the position of the said slots relative to each other, provision is made according to a further feature of the invention to dispose the slot serving to guide the jointed pin between the two steering slots.

In cameras in which the diaphragm can be set manually as well as by an automatic diaphragm setting device, several diaphragm setting functions can be accomplished with the smallest number of components, by placing the jointed pin on a two-armed shifting lever, mounted on a stationary pivot and having one of its arms as a point of engagement for the effective connection with the diaphragm setting device and its other arms as a point of engagement which can be brought into effective connection with the manual setting member. In addition to the setting members, only the two-armed shifting lever is required.

An arrangement of the shifting lever which is adapted to a camera of the foregoing type and results in an extremely short shifting distance for automatic setting, but in a relatively long shifting distance for manual operation may be accomplished according to the invention by making the lever arm cooperating with the manual setting control a multiple of the lever arm controlled by the automatic diaphragm setting device. To simplify adjustment and without detriment to the linearization, provision may also be made to have at least one of the points of engagement of the shifting lever formed by an eccentric pin.

The invention will be described in greater detail in the following specification, together with the drawings in which:

FIG. 1 shows the wide open position of two diaphragm disks mounted according to this invention and movable in opposing directions;

FIG. 2 shows the diaphragm disks of FIG. 1 in an intermediate position produced by a shifting force S;

FIG. 3 shows the diaphragm disk system according to FIG. 1 in connection with a shifting lever which can be actuated either manually or by an automatic diaphragm setting device; and FIG. 4 shows a simplified modification of the arrangement shown in FIG. 3.

To demonstrate the principle of the mounting of the diaphragm disks, a carrier plate 1 is provided in FIG. 1 which can be attached in a conventional manner with a camera housing not shown. The carrier plate 1 could just as well be a component of a diaphragm housing. A diaphragm opening 1a is formed in the carrier plate 1 and is more or less covered by two diaphragm disks 2 and 3 capable of moving in opposing directions and movably guided in the carrier plate.

To guide the two diaphragm disks 2 and 3, each of them is provided with a pin 4 and 5, respectively, each of which engages one of the steering slots 1b and 1c, respectively, in the carrier plate 1. Moreover, the diaphragm disks 2 and 3 are linked to each other by a pin 6 which can move in a guide slot 1d also located in the carrier plate 1 so that, under the effect of a return spring 7, the disks assume the starting positions shown in FIG. 1.

As may further be seen from the drawing, the three slots 1b, 1c and 1d extend approximately in the same direction, while the shape and the relative position of these slots are so chosen that the guide pins 4 and 5 will shift in the steering slots 1b and 1c in accordance with a relatively small shifting force S, applied to the jointed pin 6 and indicated by an arrow in FIG. 2, thus making the diaphragm disks move toward the the diaphragm center. By shaping the slots appropriately, the pin 6 can be made to travel the same shifting distance to change the diaphragm disks 2 and 3 from one aperture stop to the next, which makes the arrangement of a diaphragm setting scale with linear gradation possible. After releasing the pin 6, it is returned into its starting position shown in FIG. 1 by the return spring 7, whereby the diaphragm disks 2 and 3 again open the aperture 1a fully.

Using relatively simple and few components, the above-described diaphragm arrangement can be combined with the most varied setting mechanisms. In the example according to FIG. 3, the diaphragm disk system can be actuated selectively either manually or by an automatic diaphragm setting device. To accomplish this, the pin 6' linking the two diaphragm disks 2 and 3 to each other can be fastened to a shifting lever 8 and the latter can be mounted on pin 9 affixed to the carrier plate 1 so that two lever arms 8a and 8b of different lengths are formed. The lever ratio can thereby be selected in such a manner that the lever arm 8b on which the shifting force for manual setting is exerted has a length which is a multiple of that of lever arm 8a which is affected by the automatic diaphragm setting device. For example, the lever arms 8a and 8b could be selected in a ratio of 1:4, which would be equivalent to having the end of the long lever arm 8b permit the arrangement of a diaphragm setting scale having a range of adjustment four times greater than that of, the part on which the shifting force in the automatic range is exerted.

Under the effect of the return spring 7' acting upon the shifting lever 8, and the pin 6' as well as the two pins 4 and 5 assume the same starting position with respect to their slots 1d, 1b and 1c, respectively, as in the representation according to FIG. 1. The lever arm 8a has a tab 8c situated in the range of motion of a driving tab 10a which, in turn, is bent out from a ring 10, referred to as an automatic ring, which is concentric to the diaphragm aperture 1a. A scanning slide 11 of an automatic diaphragm setting device known as such and disposed in the camera is linked to the automatic ring 10. Under the effect of a spring 12, the scanning slide 11 rests against the plunger 13 for the release of the camera which, in turn, is held by a stronger return spring 14 in its starting position as shown in FIG. 3. Also provided at the scanning slide 11 is a stepped cam 11a, by means of which the pointer 15 of an exposure meter built into the camera is scanned in known manner.

To set the diaphragm manually, a setting control 16 is provided which has a driving tab 16a to engage a pin 17, which is mounted on the lever arm 8b of the shifting lever 8 and, in order to provide adjustments, is designed as an eccentric pin. The ring 16 bears a diaphragm scale 16b and the designation "Auto," both of which are set by reference to a fixed mark 18.

To avoid having the scanning slide 11 exert an influence on the shifting lever 8 when setting the diaphragm manually and actuating the release button 13, a spring loaded locking lever 19 is provided having a projection 19a that can drop into a recess 10b in the automatic ring 10. In the "Auto" position, on the other hand, the locking lever 19 is kept in the ineffective position by a cylindrical sector 16c of the manual setting ring 16.

FIG. 4 shows a modification of the arrangement according to FIG. 3, with a simplified structure. This modification makes it possible to do without the automatic ring 10 by having the scanning slide 11', which is movably guided in the camera housing, engage the shifting level 8' directly by means of an arm 11b'. The point of engagement is formed in this case by a pin 20 which is also designed as an eccentric pin for adjusting purposes. The projection 19a' of the locking lever 19' can be controlled by the manual setting member 16 to drop into a notch 11c' of the scanning slide 11', thus blocking the latter when setting the diaphragm manually.

To set the diaphragm automatically, the manual setting control 16 is turned to the position shown in FIGS. 3 and 4, in which the designation "Auto" is opposite the mark 18. In this setting, the locking lever 19 or 19', respectively, is kept out of operating position by the cylindrical cam sector 16c of the manual setting control 16. The driving tab 16a thereby is outside the range of motion of the eccentric pin 17 or 17', respectively. When depressing the release button 13, the scanning slide 11 or 11', respectively, follows its motion under the effect of spring 12 until one of the steps of cam 11a or 11a', respectively, strikes against the pointer 15 of the exposure meter. This causes the shifting lever 8 or 8', respectively, to be turned clockwise either by the tab 10a of the automatic ring 10 or directly by the scanning slide 11', thus moving the diaphragm disks 2 and 3 continually toward the center of the diaphragm due to the pin 6' attached to the shifting lever. In the arrangements according to FIGS. 3 and 4, too, the special shape of the slots 1b, 1c and 1d makes the distance moved by the diaphragm shifting lever 8 and, hence, by the automatic ring 10 or scanning slide 11, respectively, always the same when changing from one diaphragm stop to the next, i.e. the motion of the lever 8 and the automatic ring 10 is linear. After exposure, the scanning slide 11 and 11', respectively, is returned into its starting position by the relatively strong spring 14 when pressure on the release button 13 is removed so that the return spring 7' can return the diaphragm disks 2 and 3 to the position shown in FIGS. 3 and 4.

To set the diaphragm by hand, the setting control 16 is turned clockwise from its position shown in FIGS. 3 and 4 until the desired value of the diaphragm scale 16b is opposite the fixed mark 18. In this process, the tab 16a rotates the diaphragm shifting lever 8 or 8', respectively, clockwise, thereby moving the diaphragm disks 2 and 3 toward the diaphragm center again. The setting motions of the manual setting control 16 are also linear but are greater in accordance with the effective lever arm of the eccentric pin 17 or 17', respectively, than those of the automatic ring 10 or the scanning slide 11'. With the changeover from the "Auto" position to the range of scale 16b, the locking lever 19 or 19', respectively, drops into its respective notch in the automatic ring 10 or scanning side 11' rendering the automatic diaphragm setting device incapable of exerting an influence on the shifting lever 8 or 8', respectively, when the release button 13 is actuated.

What is claimed is:

1. A lens diaphragm arrangement comprising two diaphragm discs moving in opposite directions when the aperture is set; a first pin linking said discs together; a diaphragm housing; a guide slot in said housing, said pin engaging said slot; a second pin on one of said discs; a third pin on the other of said discs; a first control slot in said housing engaging said second pin; a second control slot in said housing engaging said third pin, said guide slot, first and second control slots extending approximately in the same direction; and first means to apply pressure to said first pin to move said pin along said guide slot in one direction to cause said discs to move apart.

2. The lens diaphragm arrangement of claim 1 comprising, in addition: second means to engage said first pin to move the latter along said guide slot in the opposite direction to cause said disks to move toward each other, said first and second means exerting on said first pin forces having their main component tangential to said guide slot.

3. The lens diaphragm arrangement of claim 1 in which said guide slot is located between said first and second control slots.

4. The lens diaphragm arrangement of claim 1 comprising, in addition: a shifting lever engaging said first pin; manual means engaging one end of said lever to move said lever and thereby to move said first pin; and automatic diaphragm setting means engaging the other end of said lever to move said lever and thereby to move said first pin to set said diaphragm.

5. The lens diaphragm arrangement of claim 4 in which said lever has a fulcrum disposed between said ends and the distance from said fulcrum to said one end is a multiple of the distance from said fulcrum to said other end.

6. The lens diaphragm arrangement of claim 4 comprising, in addition: an eccentric pin mounted on said lever at said one end to be engaged by said manual means.

7. The lens diaphragm arrangement of claim 4 comprising, in addition: an eccentric pin mounted on said lever at said other end to be engaged by said automatic diaphragm setting means.

References Cited

UNITED STATES PATENTS

| 3,037,437 | 6/1962 | Rentschler | 95—10 |
| 3,086,433 | 4/1963 | Kapen et al. | 95—10 |
| 3,086,436 | 4/1963 | Rentschler | 95—10 |
| 3,087,397 | 4/1963 | Hennig | 95—10 |
| 3,127,824 | 4/1964 | Williams | 95—10 |
| 3,380,356 | 4/1968 | Kiper et al. | 95—64 XR |

NORTON ANSHER, *Primary Examiner.*

JOSEPH F. PETERS, JR., *Assistant Examiner.*

U.S. Cl. X.R.

95—10